US005792380A

United States Patent [19]

Wen et al.

[11] Patent Number: 5,792,380

[45] Date of Patent: Aug. 11, 1998

[54] INK JET PRINTING INK COMPOSITION WITH DETECTABLE LABEL MATERIAL

[75] Inventors: Xin Wen; George L. Oltean; Robert O. James, all of Rochester, N.Y.

[73] Assignee: Eastman Kodak Company, Rochester, N.Y.

[21] Appl. No.: 846,693

[22] Filed: Apr. 30, 1997

[51] Int. Cl.$^6$ .............................. C09D 5/23; C09D 11/00

[52] U.S. Cl. .................................... 252/62.56; 252/62.54; 252/62.51 R; 106/31.92; 106/31.64; 106/31.32

[58] Field of Search ........................ 252/301.36, 301.35, 252/62.56, 62.51 R, 62.55; 106/31.32, 31.64, 31.92, 31.15

[56] References Cited

U.S. PATENT DOCUMENTS

| | | | |
|---|---|---|---|
| 3,946,398 | 3/1976 | Kyser et al. | 346/1 |
| 4,166,277 | 8/1979 | Cielo et al. | 346/140 R |
| 4,179,397 | 12/1979 | Rohowetz et al. | 106/31.32 |
| 4,239,544 | 12/1980 | Strem | 106/22 |
| 4,269,627 | 5/1981 | Hwang | 106/22 |
| 4,275,290 | 6/1981 | Cielo et al. | 219/216 |
| 4,405,370 | 9/1983 | Soga et al. | 106/20 |
| 4,490,728 | 12/1984 | Vaught et al. | 346/1.1 |
| 4,751,531 | 6/1988 | Saito et al. | 346/140 R |
| 4,756,758 | 7/1988 | Lent et al. | 106/31.32 |
| 4,845,456 | 7/1989 | Abe et al. | 338/32 R |
| 4,931,719 | 6/1990 | Murata et al. | 323/368 |
| 5,220,346 | 6/1993 | Carreira et al. | 106/31.49 |
| 5,225,951 | 7/1993 | Kira et al. | 360/113 |
| 5,240,626 | 8/1993 | Thakur et al. | 252/62.54 |
| 5,250,957 | 10/1993 | Onozato | 364/1.1 |
| 5,274,520 | 12/1993 | Matsuzono et al. | 360/113 |
| 5,351,158 | 9/1994 | Shibata | 360/113 |
| 5,483,162 | 1/1996 | Ushikoshi et al. | 324/252 |
| 5,506,079 | 4/1996 | Grigoryan et al. | 430/106 |
| 5,541,632 | 7/1996 | Khodapanah et al. | 347/67 |
| 5,557,310 | 9/1996 | Kurata et al. | 347/87 |
| 5,565,022 | 10/1996 | Wickramanayake | 106/22 R |
| 5,674,314 | 10/1997 | Auslander et al. | 106/31.15 |

FOREIGN PATENT DOCUMENTS

| | | | |
|---|---|---|---|
| 464474 | 1/1992 | European Pat. Off. | 106/31.64 |
| 0 745 481 A2 | 12/1996 | European Pat. Off. . | |
| 0 745 482 A2 | 12/1996 | European Pat. Off. . | |
| 2007 162 | 5/1979 | United Kingdom . | |
| 2007162 | 5/1979 | United Kingdom . | |

*Primary Examiner*—Melissa Bonner
*Attorney, Agent, or Firm*—Andrew J. Anderson

[57] ABSTRACT

An ink jet printing ink composition is disclosed for use with an ink jet printing apparatus comprising a printhead, an ink delivery system adapted to provide the ink to the printhead, and a sensor associated with the ink delivery system adapted to produce a signal which is characteristic of the concentration of a label material in a printing ink, where said signal is used to indicate the appropriateness of using a particular printing ink. The ink composition comprises a carrier, a colorant, and a predetermined concentration of a distinct label material, the weight ratio of the label material to the colorant being less than 1. The label material may be easily detected by a sensor associated with the ink delivery system.

24 Claims, 1 Drawing Sheet

INK JET PRINTING INK COMPOSITION WITH DETECTABLE LABEL MATERIAL

CROSS REFERENCE TO RELATED APPLICATIONS

Reference is made to commonly assigned U.S. patent application Ser. No. 08/846.923 INK DELIVERY SYSTEM AND PROCESS FOR INK JET PRINTING APPARATUS filed in the name of Xin Wen concurrently herewith.

FIELD OF THE INVENTION

This invention relates generally to the field of digitally controlled ink transfer printing systems, and more particularly to ink jet printing ink compositions.

BACKGROUND OF THE INVENTION

Ink jet printing has become recognized as a prominent contender in the digitally controlled, electronic printing arena because, e.g., of its non-impact, low-noise characteristics, its use of plain paper and its avoidance of toner transfers and fixing. Ink jet printing mechanisms can be categorized as either continuous ink jet or drop-on-demand ink jet. U.S. Pat. No. 3,946,398, which issued to Kyser et al. in 1970, discloses a drop-on-demand ink jet printer which applies a high voltage to a piezoelectric crystal, causing the crystal to bend, applying pressure on an ink reservoir and jetting drops on demand. Other types of piezoelectric drop-on-demand printers utilize piezoelectric crystals in push mode, shear mode, and squeeze mode. Piezoelectric drop-on-demand printers have achieved commercial success at image resolutions up to 720 dpi for home and office printers.

Great Britain Patent No. 2,007,162, which issued to Endo et al. in 1979, discloses an electrothermal drop-on-demand ink jet printer which applies a power pulse to an electrothermal heater which is in thermal contact with water based ink in a nozzle. A small quantity of ink rapidly evaporates, forming a bubble which cause drops of ink to be ejected from small apertures along the edge of the heater substrate. This technology is known as Bubblejet™ (trademark of Canon K.K. of Japan).

U.S. Pat. No. 4,490,728, which issued to Vaught et al. in 1982, discloses an electrothermal drop ejection system which also operates by bubble formation to eject drops in a direction normal to the plane of the heater substrate. As used herein, the term "thermal ink jet" is used to refer to both this system and system commonly known as Bubblejet™.

Thermal ink jet printing typically requires a heater energy of approximately 20 μJ over a period of approximately 2 μsec to heat the ink to a temperature between 280° C. and 400° C. to cause rapid, homogeneous formation of a bubble. The rapid bubble formation provides the momentum for drop ejection. The collapse of the bubble causes a tremendous pressure pulse on the thin film heater materials due to the implosion of the bubble.

U.S. Pat. No. 4,275,290, which issued to Cielo et al., discloses a liquid ink printing system in which ink is supplied to a reservoir at a predetermined pressure and retained in orifices by surface tension until the surface tension is reduced by heat from an electrically energized resistive heater, which causes ink to issue from the orifice and to thereby contact a paper receiver. This system requires that the ink be designed so as to exhibit a change, preferably large, in surface tension with temperature. The paper receiver must also be in close proximity to the orifice in order to separate the drop from the orifice.

U.S. Pat. No. 4,166,277, which also issued to Cielo et al., discloses a related liquid ink printing system in which ink is supplied to a reservoir at a predetermined pressure and retained in orifices by surface tension. The surface tension is overcome by the electrostatic force produced by a voltage applied to one or more electrodes which lie in an array above the ink orifices, causing ink to be ejected from selected orifices and to contact a paper receiver. The extent of ejection is claimed to be very small in the above Cielo patents, as opposed to an "ink jet", contact with the paper being the primary means of printing an ink drop.

In U.S. Pat. No. 4,751,531, which issued to Saito, a heater is located below the meniscus of ink contained between two opposing walls. The heater causes, in conjunction with an electrostatic field applied by an electrode located near the heater, the ejection of an ink drop. There are a plurality of heater/electrode pairs, but there is no orifice array. The force on the ink causing drop ejection is produced by the electric field, but this force is alone insufficient to cause drop ejection. That is, the heat from the heater is also required to reduce either the viscous drag and/or the surface tension of the ink in the vicinity of the heater before the electric field force is sufficient to cause drop ejection. The use of an electrostatic force alone requires high voltages.

Commonly assigned U.S. patent application Ser. No. 08/750.438 entitled A LIQUID INK PRINTING APPARATUS AND SYSTEM filed in the name of Kia Silverbrook on Dec. 3, 1996, discloses a liquid printing system that affords significant improvements toward overcoming prior art problems associated with drop size and placement accuracy, attainable printing speeds, power usage, durability, thermal stresses, other printer performance characteristics, manufacturability, and characteristics of useful inks. Silverbrook provides a drop-on-demand printing mechanism wherein the means of selecting drops to be printed produces a difference in position between selected drops and drops which are not selected, but which is insufficient to cause the ink drops to overcome the ink surface tension and separate from the body of ink, and wherein an additional means is provided to cause separation of said selected drops from said body of ink. Several drop separation techniques are disclosed by Silverbrook to ensure that the selected drops form dots on the printing medium. The drop separation means discriminates between selected drops and un-selected drops to ensure that unselected drops do not form dots on the printing medium.

Ink jet printers as described above can comprise several systems: print heads that can utilize one of the above described printing methods, ink delivery system that supply ink to the printhead, printhead transport systems that transport the printhead across the page, receiver transport systems that move receiver medium across the printhead for printing, image data process and transfer systems that provide digital signals to the printhead, printhead service stations that cleans the printhead, and the mechanical encasements and frames that support all the above systems.

The ink delivery system in an ink jet printer may exist in several forms. In most page-size ink jet printers, the ink usage is relatively low. The ink is stored in a small cartridge that is attached to, or built in one unit with, the printhead. Examples of the ink cartridges are disclosed in U.S. Pat. Nos. 5,541,632 and 5,557,310. In large format ink jet printers, the ink usage per print is usually high. Auxiliary ink reservoirs are required to store large volumes of ink fluid that are connected to the ink cartridges near the print heads. Examples of auxiliary ink reservoirs are disclosed in European Patents EP 0 745 481 A2 and EP 0 745 482 A2. The level of the ink residual quantity in a reservoir may be monitored either electrically or optically. U.S. Pat. No. 5,250,957, for example, discloses an ink detector that senses ink by measuring the electric resistance in the ink.

Jet velocity, separation length of the droplets, drop size and stream stability are greatly affected by the surface tension and the viscosity of the ink. The use of a particular ink desirably results in physical properties compatible with the specific range of ejecting conditions associated with a particular printing device, i.e., driving voltages and pulse widths for thermal ink jet printing devices, driving frequencies of the piezo element for either a drop-on-demand device or a continuous device, and the shape and size of the nozzle.

One problem associated with ink jet printing lies in the variabilities in the physical properties and the chemical compositions of various commercial ink jet inks. As discussed above, the various types of ink jet printers require use of inks which possess distinct critical physical properties in order to function effectively during printing. Also, for color printing, combinations of inks comprising specific cyan, magenta and yellow colorants are generally required to provide accurate, visibly pleasing reproductions of the overall color gamut. Mismatching the wrong types of inks to a printer and receiver medium can compromise the ideal performance of the ink jet printers. For example, print density and color balance can be adversely affected by variations in the physical properties or chemical composition of the ink. These adverse effects can occur within a print, between prints of a given printer, and/or between prints from different printers. Print failures such as in-jet nozzle plugging can also occur as a result of the above described variabilities. Verification of the use of the desired type of ink jet ink with a particular ink jet printer is complicated by the fact that almost all ink jet inks comprise visually similar cyan, magenta, yellow or black formulations, which are not easily distinguishable prior to use.

DISCLOSURE OF THE INVENTION

It is an object of the present invention to overcome to the previously described difficulties.

It is another object of the present invention to provide printing inks which easily allow for monitoring ink colorant concentrations for reducing variabilities in color gamut and print densities.

It is another object of the present invention to provide printing inks which easily allow for detecting ink type during ink refillinging processes and before printing operations so that the ink matches the printer and the receiver media for achieving the best print image qualities and printer performance.

In accordance with one embodiment of the present invention, an ink jet printing ink composition is disclosed for use with an ink jet printing apparatus comprising a printhead, an ink delivery system adapted to provide the ink to the printhead, and a sensor associated with the ink delivery system adapted to produce a signal which is characteristic of the concentration of a label material in a printing ink, where said signal is used to indicate the appropriateness of using a particular printing ink. The ink composition comprises a carrier, a colorant, and a predetermined concentration of a label material, the weight ratio of the label material to the colorant being less than 1. The label material may be easily detected by a sensor associated with the ink delivery system.

According to various preferred embodiments of the present invention, the label material may comprise a static or electromagnetic field generating material, a magnetizable material, a fluorescent photon emitting material, a material which substantially changes the dielectric properties of the ink composition, or a material which absorbs in the ultraviolet, visible, or infrared regions of the electromagnetic spectrum which exhibits absorption characteristics distinct from those of the colorants used in the inks.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawing, in which.

DETAILED DESCRIPTION OF THE INVENTION

Figure 1:
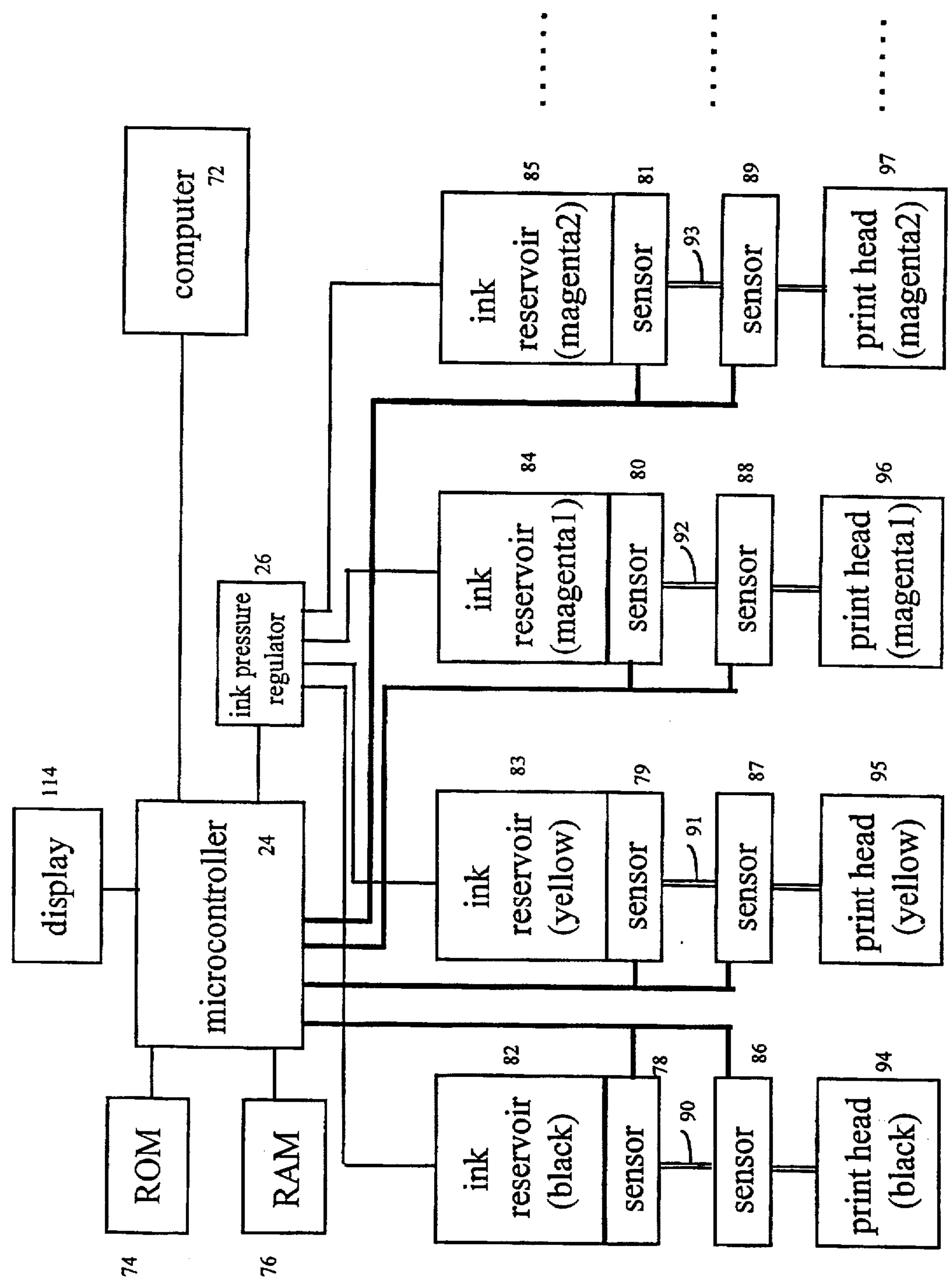
FIGURE 1 is a block diagram of an ink delivery system in which the ink compositions of the present invention may be used.

The present description will be directed in part to elements forming part of, or cooperating more directly with, apparatus which may be used with ink compositions in accordance with the present invention. It is to be understood that elements not specifically shown or described may take various forms well known to those skilled in the art.

Ink compositions in accordance with the present invention may be used with printers which comprise an ink delivery system which includes an ink reservoir and an ink flow channel between the ink reservoir and the printhead. The sensor in such ink delivery system may be positioned to sense the concentration of the label material in the ink in the flow channel or in the ink reservoir.

Ink compositions in accordance with the present invention may be used in a process for ink refilling comprising the steps of detecting the presence of a label material in ink and rejecting inks that do not contain the label material or least a predetermined concentration of the label material, or that do not contain the label material within a predetermined concentration range.

Details of the work flow algorithms for the ink refilling process and the printing preparation process which may be used with ink compositions in accordance with the present invention are disclosed in commonly assigned and concurrently filed U.S. patent application Ser. No. 08/846,923, now abandoned, cross-referenced above, the disclosure of which is incorporated by reference herein in its entirety.

FIGURE 1 illustrates a preferred embodiment of an ink delivery system comprising a label material sensor which may be used with ink compositions in accordance with preferred embodiments of the present invention. Microcontroller 24 is connected to a computer 72, a Read Only Memory (ROM) 74 a Random Access Memory (RAM) 76, and ink pressure regulator 26 that regulates the ink pressure in ink reservoirs 28. Microcontroller 24 is also connected to four ink sensors 78–81 that detect predetermined characteristics of the inks in the ink reservoirs 82–85, respectively. Microcontroller 24 is also connected to four ink sensors 86–89 that detect characteristics of the inks in ink connection tubes 90–93. Microcontroller 24 is further connected to the holder of the ink cartridge (not shown) for detecting the presence of the ink cartridge. The ink jet printer can utilize multiple print heads 94–97, with each printhead connected to one ink reservoir. The ink types include black, yellow, magenta, and cyan colors and can also include several inks within each color. For example, labels "magenta1" and "magenta2" in FIGURE 1 can represent magenta inks at different colorant concentrations.

Sensors 78–81 and 86–89 are designed to be used in combination with inks in accordance with the invention, so as to be able to detect the existence and the concentration of a label material in the ink. The term "label material" refers herein to an ink ingredient that is added to the ink and is detectable by sensors 78–81 and 86–89 in the ink delivery system, which sensors produce a signal which is characteristic of the concentration of the label material in the ink. The concentration of the label material is predetermined by the ink manufacturer, and is used as a signature for the ink being used. The ratio of the label concentration to the concentration of the colorant is held as constant in the ink The label material preferably is not required to perform any other functions in the printhead or on the receiver media. In other words, the ink can preferably print images with desired qualities in the absence of the label materials. Use of inks in accordance with the invention comprising distinct label materials allow for easily detecting ink type during ink refillinging processes and before printing operations to assure that the ink matches the printer and the receiver media for achieving the best print image qualities and printer performance, as well as monitoring ink colorant concentrations for reducing variabilities in color gamut and print densities.

Printing ink compositions in accordance with the invention comprise a carrier, a colorant and a label material. The present invention is generally applicable to many kinds of inks: pigmented inks, dye based inks, inks formed in aqueous solutions or organic solvents. Properties and examples of pigmented and dye inks can be found in "Dye Versus Pigment: The Truth" by P. Gregory, p276 "Recent Progress in Ink Jet Technologies", published by Society for Imaging Science and Technology.

The inks of the present invention may be used in black only, or in color printers, such as three- or four-color ink jet printers, e.g., printers which contain print cartridges capable of printing cyan, magenta, and yellow (CMY three-color printers), or cyan, magenta, yellow, and black (CMYK four-color printers). Suitable cyan, magenta, yellow and black pigments for use as ink colorants are disclosed, e.g., in copending, commonly assigned U.S. Ser. No. 08/699,877 of Sanfilli et al. A useful 3-color ink set comprises pigment red 122, pigment yellow 74, and bis(phthalocyanylalumino) tetraphenyldisiloxane. A useful 4-color pigmented ink set comprises pigment black 7, pigment red 122, pigment yellow 74, and bis(phthalocyanylalumino) tetraphenyldisiloxane. Inks may also be made from suitable dye compounds colorants as is well known in the art, such as described, e.g., in U.S. Pat. Nos. 4,239,544, 4,269,627, and 5,565,022.

The process of preparing inks from pigment colorants commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as DELRIN™, vinyl chloride polymers and copolymers, polyurethanes, polyamides, poly(tetrafluoroethylenes), e.g., TEFLON™, and other fluoropolymers, high density polyethylenes, polypropylenes, cellulose ethers and esters such as cellulose acetate, poly(hydroxyethylmethacrylate), poly(hydroxyethyl acrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill and a bead mill. A high speed mill is particularly useful.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, in Cowles-type saw tooth impeller having a diameter of 40 mm when operated at 9,000 rpm. Useful proportions of the milling media, the pigment, the liquid dispersion medium and dispersant can vary within wide limits and depends, for example, upon the particular material selected and the size and density of the milling media etc. The process can be carried out in a continuous or batch mode.

In an exemplary batch milling process, a slurry of <100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

In an exemplary continuous media recirculating milling process, a slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration.

With either of the above modes the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of useful dispersants. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The carrier medium of the printing ink compositions of the invention may be either an aqueous or organic solvent based solution, and preferably comprises water or a mixture of water and at least one water miscible co-solvent. Selection of a suitable mixture depends on requirements of the specific application, such as desired surface tension and viscosity, the selected pigment or dye colorant, drying time of the ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol dimethyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

The label material of the ink compositions of the invention can be any material which can be easily detected in a printing ink by a respective sensor. In one example, the label material can comprise dielectric properties that are different from those of the inks. The change in the dielectric properties in the ink comprising this label material can be detected by a sensor which generates an electromagnetic field. In another example, the label material absorbs in the ultraviolet, visible, or infrared wavelengths with absorption characteristics distinctly different from that provided by the main colorant in the inks. The presence and concentration of these label materials can be detected by measuring the absorption spectrum of the label materials. In yet another example, the label material can emit fluorescent photons at specific wavelengths when the label material is illuminated by the certain photons. The detection of these fluorescent photons with an appropriate sensor again can be used for sensing the label material in the ink. In preferred embodiments of the invention, the label material comprises a static or electromagnetic field generating material (e.g., ferromagnetic materials such as γ-ferric oxides, cobalt-γ-ferric oxides, magnetite, cobalt-magnetite, barrium ferrite, strontium ferrite, or other magnetic metal alloys) or a magnetizable material (e.g., a paramagnetic material). While printing inks have been previously proposed which may comprise substantial levels of components such as infrared absorbing or magnetic materials (which types of materials may function as label materials in accordance with the invention) in order to provide a printed image with corresponding properties, the instant invention is distinguished in that the label material is used at a relatively low concentration relative to the ink colorant, as it is not required to provide a function in the resulting printed image.

Label materials in inks in accordance with the invention are desirably easily detectable with conventional sensors and capable of providing distinct signals unique to a particular printing ink composition. Various magnetic sensors, e.g., can be used to detect the presence and concentration of magnetic label material in inks in accordance with preferred embodiments of the invention. For example, sensors are known wherein an internal resistance changes as a function of the magnetic field strength experienced by the sensor. This is an indication of the concentration of magnetic label material in the ink. The resistance of the magnetic sensors varies as a function of the magnetic field strength. Details of the detection circuits for the magnetic resistance sensors are disclosed in U.S. Pat. Nos. 4,845,456 and 5,483,162. One type of magnetic resistance sensors is the thin-film magnetoresistance sensor. This type of sensor is described in U.S. Pat. Nos. 5,225,951, 5274,520 and 5,351,158. Hall-effect magnetic sensors, as disclosed in U.S. Pat. No. 4,931,719, can also be used for the purpose of the present invention.

In general it is desirable to make a pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

Colorants may typically be used in ink jet printing ink compositions at concentrations up to approximately 30% by weight, but will generally be in the range of approximately 0.1 to 10% (more commonly 1–5%) for dyes and approximately 0.1 to 15% (more commonly 1–10%) for organic pigments, by weight of the total ink composition for most thermal ink jet printing applications. If an inorganic pigment is selected, the ink will tend to contain higher weight percentages of colorant than with comparable inks employing organic pigments or dyes, and may be as high as approximately 75% in come cases.

The concentration of label material in the ink compositions of the invention is less than that of the colorant. In order to minimize any effect of the label material on the resulting color and physical performance characteristics of the printing ink, weight ratios of label material to colorant of less than or equal to 0.5, and more preferably less than or equal to 0.1 are suggested, as well as absolute concentrations of less than 5%, more preferably less than 1%, and most preferably less than 0.1% label material by weight of the total ink composition. In order to provide a good signal to noise response from a corresponding sensor, weight ratios of label material to colorant of at least $10^{-6}$, more preferably at least $10^{-4}$ and even more preferably $10^{-2}$ are suggested, with absolute concentrations of at least 0.1 part per million, preferably at least 0.001% and more preferably at least 0.01% label material by weight of the total ink composition. Use of a distinct label materials at such relatively minor concentrations as a signature for the ink being used allows for easily detecting ink type without substantially changing ink color and performance.

The amount of carrier medium is generally in the range of approximately 70 to 99 weight %, preferably approximately 90 to 99 weight %, based on the total weight of the ink. A mixture of water and a polyhydric alcohol, such as diethylene glycol, is useful as an aqueous carrier medium. In the case of a mixture of water and diethylene glycol, the aqueous carrier medium usually contains from about 30% water/70% diethylene glycol to about 95% water/5% diethylene glycol. Useful ratios are approximately 60% water/40% diethylene glycol to about 95% water/5% diethylene glycol. Percentages are based on the total weight of the aqueous carrier medium.

Block copolymers may be used as dispersants for colorants, especially for milled pigments. Preferably, such dispersants are added in a concentration of 0.2 to 5 weight percent if not already included in a mill grind. Included are block copolymer of ethylene oxide and propylene oxide having a structure selected from the following:

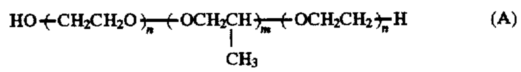

having a number average molecular weight of 4000 to 15,000 and the ratio of n/m of 5 to 10;

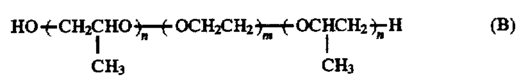

having a number average molecular weight of 4000 to 9000 and a ratio of n/m of 8 to 15.

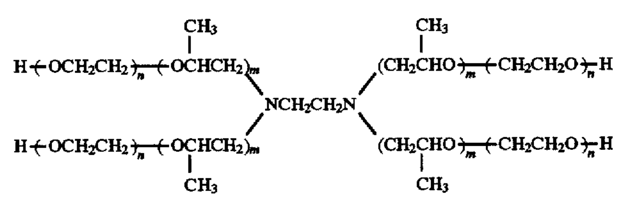

having a number average molecular weight of 5,000 to 40,000 and a ratio of n/m of 5 to 10; and

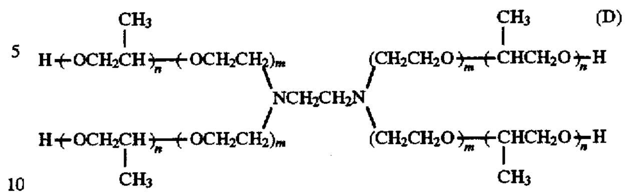

having a number average molecular weight of 8,000 to 20,000 and a ratio of n/m of 8 to 15. The structure may be either linear triblock (ABA or BAB) morphology in which A represents polyethylene oxide and B the polypropylene oxide. Useful block copolymers also include branched tetrafunctional type copolymers derived from the sequential addition of propylene oxide and ethylene oxide to ethylenediamine.

Solid block copolymers (A), (B), (C) and (D), having the defined molecular weights, and the blocks of polyethylene oxide and polypropylene oxide are commercially available from BASF Corporation under the name Pluronic® and Tetronic® surfactants. Block copolymer concentration in the inks is most useful from 0.2 to 5 weight percent, based on the total weight of the ink composition. Concentration below 0.2 weight percent have limited effectiveness, while at concentrations higher than 5% image quality may deteriorate.

Examples of useful block copolymers, together with their respective Pluronic® trade designations, number average molecular weights, number of each block copolymer units and their relative ratios in the block copolymer are presented below. Examples of ABA block copolymers are:

| Pluronic ® Designation | MW | Each n | m | n/m |
|---|---|---|---|---|
| F38 | 4k | 40 | 10 | 8 |
| F68 | 8k | 80 | 20 | 8 |
| F108 | 14K | 140 | 40 | 7 |

Examples of BAB block copolymers are:

| Pluronic ® Designation | MW | Each n | m | n/m |
|---|---|---|---|---|
| 10R8 | 5K | 90 | 15 | 6 |
| 17R8 | 7K | 135 | 23 | 6 |
| 25R8 | 9K | 160 | 30 | 6 |

Branched block copolymers are available under the tradename TETRONIC from BASF Corporation. Tradename designations falling within the structures (C) and (D) are TETRONIC 707, 1107 and 1508.

Jet velocity, separation length of the droplets, drop size and stream stability are greatly affected by the surface tension and the viscosity of the ink Pigmented ink jet inks suitable for use with ink jet printing systems generally should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are generally no greater than 20 centipoise, and preferably in the range of about 1.0 to about 10.0, preferably 1.0 to 5.0 centipoise at room temperature.

Additional ingredients may also be added to the ink jet inks of the invention. A humectant, or co-solvent, is commonly added to ink jet inks to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, pH adjusters, buffers, conductivity enhancing agents, anti-kogation agents, drying agents, and defoamers.

Ink jet printing inks are most advantageously used in conjunction with ink jet paper or transparent media optimized for the ink jet printer and the specific desired application. Photographic quality inkjet paper, such as that manufactured and sold by the Eastman Kodak Company, may be particularly useful, as the optical density and color gamut are typically enhanced when inks are deposited on this type of paper. However, the inks compositions of the invention will also be useful for printing on a variety of transparent and opaque films, and even on so-called plain papers.

The formulations of primary inks, label materials and inks comprising label material can be better understood by the following examples.

Primary Ink Formula

In the present invention, the term primary ink refers to the inks that can be used by the prior art ink jet printing apparatus for ink jet printing in the absence of any label material. The primary ink used in the following examples of the present invention was black in color and was based on pigment black 7, Black Pearls 880 obtained from Cabot Corp., and was prepared as follows. First, the following ingredients were added to a 1-liter, water-cooled milling vessel:

| | |
|---|---|
| 300 g | polymeric beads, 50 micron mean diameter (milling media) |
| 200 g | de-ionized water |
| 16 g | N-methyl-N-oleoyl taurate (OMT, dispersant) |
| 40 g | pigment black 7 (Black Pearls 880, Cabot Corp.). |

The mixture was milled for 4 hr at 700 rpm using a Cowles-type dispersing blade (40 mm diameter). The mill grind was separated from the grinding media by passing through 15-micron filter. The mill grand is then diluted to a working strength ink with the following composition:

2.25 wt % Pigment Black 2.5 wt % diethylene glycol 2.5 wt % glycerol de-ionized water to 100 wt %.

Details of the preparation process including other colored inks are disclosed in the commonly assigned co-pending U.S. patent application Ser. No. 08/699,877 by Santilli et al.

Magnetic Label Material A Dispersion

The Magnetic Label Material A comprise a finely divided concentrate of a magnetic material made by milling 20 parts of Co-surface-treated γ-iron oxide powder supplied by Toda Kogyo under the trade designation CSF 4085V2 and 20 parts of a 50 wt % solution of the dispersion Syn Fac 8337 (solid by Milliken Chemical) in 70 parts deionized water in a small media mill. The sample was milled for 1–1.5 hours until the average particle size was down to 0.25 microns. Details of the milling procedure including the dispersant in the milling are disclosed in commonly assigned U.S. Pat. No. 5,457,012 by Nair and Oltean.

Magnetic Label Material B Dispersion

Magnetic Label Material B is a dilute aqueous magnetic ink dispersion prepared by letdown of a small quantity of a concentrated aqueous magnetic dispersion. The concentrated magnetic dispersion was milled with a starting composition as follows:

| | | |
|---|---|---|
| Magnetic particle | Toda CSF 4085V2 | 600 g |
| Deionized water | | 723 g |
| Dispersant | Dequest 2006 | 12 g |
| Total | | 1335 g |

The mill was filled with water, the Dequest 2006 was added to the mill, then the Toda CSF 4085V2 magnetic powder was added slowly to the mill while agitating the slurry contained in the mill funnel that is waiting to be circulated through the mill chamber. The mill contained 250 ml small media mill loaded with 1.3 mm steel media at 85 vol % of the mill chamber. The milling process lasted for 3 hours at about 3700 rpm and 65 F.

Details of the Magnetic Label Material B can be found in commonly assigned U.S. Pat. No. 5,520,954 by Oltean et al.

Magnetic Label Material C Dispersion

The Magnetic Label Material C is a Cobalt-γ-Ferric Oxide (Co-γ-$Fe_2O_3$) hydrosol that is available from Nissan Chemical Industries, LTD., under sample number F-2. The hydrosol is dispersed in water and has a dark brown color. It has a specific gravity of 1.196 g/cc at 25 C., pH 9.31 stabilized by KOH, and viscosity of 45.8 c.p. at 25 C. The mean particle size is estimated to be 21.2 nanometers as measured by specific surface area using gas absorption technique.

Magnetic Label Material D Dispersion

The Magnetic Label Material D is the same as that of Magnetic Label Material C, except a different concentration is used as indicated in Table I below.

Magnetic Label Material E Dispersion

This label material is a cobalt magnetite hydrosol (Co-$Fe_3O_4$) that is available from Nissan Chemical Industries, LTD., under sample number F-3. The hydrosol is dispersed in water and has a black clear color. It has a specific gravity of 1.204 g/cc at 25 C., pH 9.10 stabilized by KOH, and viscosity of 79.2 c.p. at 25 C. The particle size is estimated to be 23.8 nanometers as measured by specific surface area using gas absorption technique.

Final Ink Composition

The final inks comprising magnetic label materials are obtained by mixing the magnetic label material dispersions prepared by each of the Magnetic Label Material Formula A, B, C, D or E to the primary ink, which are summarized in Table 1 to provide the indicated label:colorant weight ratios. The workable concentration range of the magnetic label material in the final ink is 0.1 part per million to 5 wt %. The most preferred ratio of label material to colorant in the final ink is from 1:10 to 1:100.

TABLE I

Summary of Inks Comprising Magnetic Label Materials

| Magnetic Label Material | Coersive Force (Oe) | Specific Magnetic Moment (emu/g) | Magnetic Label Concentration | Color of Magnetic Label | Colorant: Label weight ratio |
|---|---|---|---|---|---|
| A | 830 | 72 | 0.11 wt % | Brown | 20.5 |
| B | 830 | 72 | 0.14 wt % | Brown | 16.1 |
| C | 695 | 63.1 | 0.15 wt % | Brown | 15 |
| D | 695 | 63.1 | 0.05 wt % | Brown | 45 |
| E | 830 | 72 | 0.10 wt % | Black | 22.5 |

The final inks comprising the magnetic label materials were tested in an ink jet printing apparatus involving the following steps. First an ink solution was filled into an ink reservoir. The ink was then drawn into the connect tubes that connect the ink reservoir and the ink jet print head. An Hall-effect magnetic detector was used to detect the magnetic label material in the connection tube. When the detector was away of any magnetic materials, the detector outputted no signal. When the detector was brought to close vicinity of the ink connect tubing or the ink reservoir, an electric voltage was generated in the sensor. The magnitude of the voltage signal increased with the strength of the magnetic field it detected, which corresponds to the concentration of the magnetic label material in the ink. The concentration of the colorant in the inks may be determined from the voltage signal based on the label:colorant ratios listed in Table I.

The magnetic materials described in the above examples are non-limiting examples of types of label materials which may be used in the ink compositions of the invention. It will be readily understood by the artisan that many other signal generating label materials may alternatively be used in inks which are detectable by their respective sensors as described above. The important feature is that a distinct label material is used in an otherwise functional printing ink to provide a signal which is readily detectable to identify the ink being used in an ink jet printer.

While the above examples demonstrate the invention with the use of a black or brown label material in combination with a black pigmented ink, magnetic particles and other types of label materials can exist in many other colors, and can be used to match the color of the inks in accordance with the present invention in order to minimize any effect of the label material on the resulting final ink color. Details of preparation of colored magnetic particles, e.g., are disclosed in U.S. Pat. No. 5,506,079.

In accordance with various embodiments of the invention, color ink jet ink sets comprising cyan, magenta, and yellow (and further optionally black) inks may be prepared with different concentrations of a label material so that the inks may be readily differentiated from each other when used with an ink delivery system employing an appropriate sensor. Alternatively, all inks of a set may employ a label material at the same concentration to identify them as belonging to the same set. However, if desired, only one or two (or three) of the inks of a set may comprise the label material.

The invention has been described in detail with particular reference to preferred embodiments thereof, but it will be understood that variations and modifications can be effected within the spirit and scope of the invention.

What is claimed is:

1. An ink jet printing ink composition for use with an ink jet printing apparatus comprising a printhead, an ink delivery system adapted to provide the ink to the printhead, and a sensor associated with the ink delivery system adapted to produce a signal which is characteristic of the concentration of a label material in a printing ink, where said signal is used to indicate the appropriateness of using a particular printing ink, said composition comprising: a carrier, a colorant, and a predetermined concentration of a magnetic field generating or magnetizable label material which provides a signature for the ink composition, the weight ratio of the label material to the colorant being less than or equal to 0.5.

2. An ink composition according to claim 1, wherein the label material comprises magnetic particles.

3. An ink composition according to claim 1, wherein the label material comprises γ-ferric oxide or cobalt-γ-ferric oxide particles.

4. An ink composition according to claim 1, wherein the label material comprises magnetite or cobalt magnetite particles.

5. An ink composition according to claim 1, wherein the weight ratio of the label material to the colorant is from 1:10,000 to 1:2.

6. An ink composition according to claim 5, wherein the weight ratio of the label material to the colorant is from 1:100 to 1:10.

7. An ink composition according to claim 1, wherein the colorant comprises pigment particles.

8. An ink composition according to claim 1, wherein the colorant comprises dye molecules.

9. An ink composition according to claim 1, wherein the carrier comprises an aqueous solution.

10. An ink composition according to claim 1, wherein the carrier comprises an organic solvent.

11. An ink composition according to claim 1, wherein the concentration of the label material is 0.1 part per million to 5 wt % based on weight of the total ink composition.

12. An ink composition according to claim 11, wherein the concentration of the label material is 0.001 to 1 wt % based on weight of the total ink composition.

13. An ink composition according to claim 1, wherein the weight ratio of the label material to the colorant is less than or equal to 0.1.

14. An ink jet printing ink composition for use with an ink jet printing apparatus comprising a printhead, an ink delivery system adapted to provide the ink to the printhead, and a sensor associated with the ink delivery system adapted to produce a signal which is characteristic of the concentration of a label material in a printing ink, where said signal is used to indicate the appropriateness of using a particular printing ink, said composition comprising: a carrier, a colorant, and a predetermined concentration of a magnetic field generating or magnetizable label material which provides a signature for the ink composition, the weight ratio of the label material to the colorant being less than 1 and wherein the concentration of the label material is 0.1 part per million to 5 wt % based on weight of the total ink composition.

15. An ink composition according to claim 14, wherein the concentration of the label material is 0.001 to 1 wt % based on weight of the total ink composition.

16. An ink composition according to claim 14, wherein the label material comprises γ-ferric oxide or cobalt-γ-ferric oxide particles.

17. An ink composition according to claim 14, wherein the label material comprises magnetite or cobalt magnetite particles.

18. An ink composition according to claim 14, wherein the colorant comprises pigment particles.

19. An ink composition according to claim 14, wherein the colorant comprises dye molecules.

20. An ink composition according to claim 14, wherein the carrier comprises an aqueous solution.

21. An ink composition according to claim 14, wherein the carrier comprises an organic solvent.

22. An ink composition according to claim 14, wherein the weight ratio of the label material to the colorant is from 1:10,000 to 1:2.

23. An ink composition according to claim 14, wherein the weight ratio of the label material to the colorant is from 1:100 to 1:10.

24. An ink composition according to claim 14, wherein the weight ratio of the label material to the colorant is less than or equal to 0.1.

* * * * *